United States Patent Office 3,061,632
Patented Oct. 30, 1962

3,061,632
PROCESS FOR PRODUCTION OF ASPIRIN ANHYDRIDE
William R. Surine, Laurence A. Pursglove, and Wesley C. Stoesser, Midland, Mich., assignors to The Dow Chemical Company, Midland, Mich., a corporation of Delaware
No Drawing. Filed Aug. 31, 1959, Ser. No. 836,946
5 Claims. (Cl. 260—480)

This invention relates to a process for the preparation of aspirin anhydride (acetylsalicylic anhydride). It more particularly relates to a method for the production of aspirin anhydride from asymmetrical aspirin-acetic anhydride, and to the subsequent recovery of substantially pure aspirin anhydride from the reaction mixture.

The preparation of aspirin anhydride conventionally is carried out by reacting, at low temperatures, acetylsalicylic acid (aspirin) with thionyl chloride in the presence of pyridine as follows:

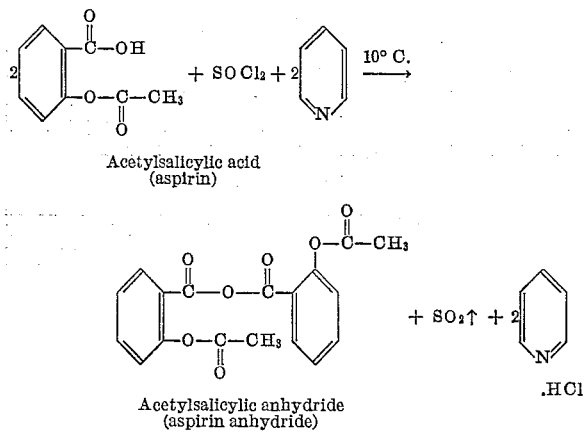

Alternatively phosgene, phosphorus oxychloride, phosphorus trichloride or phosphorus tribromide may be substituted for the thionyl chloride, and dimethylaniline or other tertiary amines may be substituted for the pyridine in this reaction, but in all cases the overall process is expensive and results in poor yield of the aspirin anhydride product. Low, relatively hard to control temperatures are required, and the highly odorous sulfur dioxide, pyridine or other amine impurities present are difficult to remove completely from the desired product. Generally an impure product having a wide melting range and requiring expensive purification processing is obtained unless extreme care is taken in this method.

It is recognized that the general processes disclosed in the art for the preparation of organic acid anhydrides (U.S. Patents 2,423,569, 2,178,752, 2,236,125 and 2,099,-909) which allegedly teach the reaction of carboxylic acids with acetic anhydride or ketene to yield a mixed ester anhydride, the heating of which ester anhydride may yield acetic anhydride and the acid anhydride by disproportionation, theoretically could be applicable to the preparation of aspirin anhydride. However, in none of these references is there taught or even suggested that by practicing the invention under the reaction conditions disclosed therein could there be produced a pure, crystalline pharmaceutical grade aspirin anhydride.

This lack of a good method for the preparation of substantially pure aspirin anhydride now unexpectedly has been overcome by the present invention which provides a new, useful and heretofore unobvious way of producing substantially pure aspirin anhydride by heating aspirin-acetic anhydride under anhydrous, controlled and critical reaction conditions to regenerate and remove acetic anhydride therefrom, followed by recovery of the substantially pure aspirin anhydride product (melting point 83–86° C.) from a solution of the crude product mixture dissolved in a suitable organic solvent. The term aspirin-acetic anhydride used herein means the asymmetrical anhydride of acetylsalicylic acid and acetic acid. Its formula is

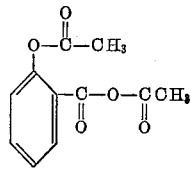

In practicing the method of the invention, aspirin-acetic anhydride first is prepared either (1) by heating together acetylsalicylic acid (aspirin) or salicylic acid and an excess of acetic anhydride and removing the co-produced acetic acid and excess acetic anhydride by distillation, or (2) by reacting in an inert organic solvent, such as acetone, salicylic acid or aspirin with ketene at room temperature, distilling off the solvent and recovering directly the mixed aspirin-acetic anhydride.

Substantially complete regeneration and removal of the acetic anhydride from the so-produced asymmetrical aspirin-acetic anhydride to leave the desired aspirin anhydride is effected, without noticeable degradation of the residual aspirin anhydride, by distilling the acetic anhydride from the asymmetrical anhydride under anhydrous conditions at a preselected temperature within a temperature range of from about 50° to about 100° C. This preselected temperature is maintained by the application of heat and by continually decreasing the pressure of the system during the distillation to remove substantially all of the acetic anhydride component from the reaction mixture. Preferably, as the distillation proceeds, the ultimate absolute pressure of the system reaches from about 0.1 to about 2 millimeters of mercury; a final pressure of less than 10 millimeters mercury is desired, and an operable ultimate absolute minimum pressure which will still permit satisfactory distillation of acetic anhydride, at the selected temperature, is about 25 millimeters mercury.

Although the operable distillation temperature range for production and removal of the acetic anhydride from the aspirin-acetic anhydride has been shown to be from about 50° to about 100° C., a desired distillation temperature range is from about 75° to about 90° C., and the preferred distillation temperature is from about 80° to about 85° C. At temperatures lower than about 50° C. there is little release of acetic anhydride, and at temperatures higher than indicated, substantial degradation of the aspirin anhydride product itself occurs.

The time of distillation varies inversely with the temperatures employed. For example, at a distillation temperature of about 80° to 90° C. essentially complete removal of acetic anhydride from the mixed aspirin-acetic anhydride is usually accomplished in about 3 to 7 hours, while at about 55° C. substantial reaction is obtained only after about 12 to about 20 hours or more. Normally the distillation will be carried out until essentially no further acetic anhydride is distilled but without there being any substantial degradation of the aspirin anhydride product itself.

The residual so-produced crude aspirin anhydride product then is dissolved in a suitable inert, organic solvent such as tetrachloroethylene, ethylbenzene, acetone-water mixture and the like from which solution a pure, crystalline aspirin anhydride product is obtained by crystallization. This product is removed from the mix by filtration, washed with additional solvent prior to removal from the filtration apparatus and oven-dried at about 50° C.

As an alternative to this method, the preparation of the asymmetrical aspirin-acetic anhydride and subsequent distillation of the co-produced acetic acid and excess acetic anhydride can be carried out in the presence of a suitable solvent, inert to the reaction products or mixed ingredients and which forms an azeotropic mixture with the acetic acid and acetic anhydride or is capable of stripping these materials from the reaction mixture. Examples of suitable solvents are ethylbenzene, cumene, ortho-dichlorobenzene and the like. Additionally, a catalyst such as sulfuric acid or an acid form of a cationic exchange resin (e.g., "Dowex 50") may also be used in this method if desired. Use of solvent in the reaction system permits higher distillation pressures, e.g. about 150 millimeters mercury absolute at about 95–100° C. distillation temperature, since removal of the acetic anhydride and acetic acid is promoted by the stripping action of the solvent carrier. The time or manner of adding the solvent is not critical. For example, the solvent can be added at the same time the initial acetic anhydride-aspirin or acetic anhydride-salicylic acid reaction mixture is prepared, during the initial reaction period, just prior to the distillation, or even during the distillation of the acetic anhydride and acetic acid. After substantial removal of the acetic anhydride and acetic acid is obtained, the residual solution of aspirin anhydride in the solvent is filtered and then cooled to room temperature with stirring, the aspirin anhydride crystallizing directly therefrom.

If the reaction is carried out using distillation conditions differing from those disclosed herein, at higher temperatures extensive degradation of the aspirin anhydride product occurs and at lower temperatures there is incomplete reaction. These extremes in reaction conditions result respectively in the formation of oil-like polymeric and solid incompletely reacted impurities, both types of impurities being hard to remove from the product mixture. The presence of these impurities results therefore in a product which is hard to crystallize and which has a wide melting temperature range or even results in a completely uncrystallizable oil. At distillation pressures higher than specified herein, there also results incomplete removal of the acetic anhydride from the reaction mixture.

The following examples will serve to illustrate the invention further.

Example 1

Salicyclic acid (276 grams) and acetic anhydride (715 grams), equivalent to a mix ratio of about 3.5 moles acetic anhydride per mole of salicyclic acid, were reacted for about one hour at about 90° C., and the mix then distilled at a constant temperature of 90° C. over a 7 hour period to remove the reaction produced acetic acid and acetic anhydride therefrom. The pressure of the system during this distillation period was continually reduced until a minimum pressure of about 18 millimeters mercury absolute was reached. The resulting aspirin anhydride product mixture was dissolved in 400 milliliters of tetrachloroethylene, and the aspirin anhydride crystallized therefrom. This product mixture then was filtered under vacuum, washed with about a hundred grams of tetrachloroethylene, and oven-dried at about 50° C. The resulting white, crystalline, substantially pure aspirin anhydride melted from about 83.5 to about 85° C.

Example 2

In the same manner as in Example 1, 276 grams of salicylic acid and 817 grams of acetic anhydride (equivalent to a mole ratio of about 4 moles of acetic anhydride per mole of salicylic acid) were reacted for about a half hour at atmospheric pressure at about 80° C. and the acetic acid and acetic anhydride distilled from the mix over about a 5 hour period at a constant temperature of 80° C. with constantly decreasing pressure until an ultimate minimum of about 6 millimeters mercury absolute was reached. The temperature then was increased to about 90° C., and the distillation continued for about an hour and three quarters at this temperature and at the same pressure to yield the crude aspirin anhydride. This product mixture was dissolved in 400 milliliters tetrachloroethylene. The aspirin anhydride was crystallized from this solution, filtered, the product washed with 190 grams of tetrachloroethylene, and then dried at about 50° C. From this reaction a yield of about 68 percent of white, crystalline substantially pure aspirin anhydride, melting from 84° to 86° C., was obtained.

Example 3

In the same manner as in Example 1, 2210 grams of salicylic acid and 8167 grams of acetic anhydride (equivalent to a mole ratio of about 5 moles of acetic anhydride per mole of salicylic acid) were reacted at atmospheric pressure for about a half hour at 90° C., followed by distillation of the acetic acid and acetic anhydride over about a 6 hour period under continually decreasing pressure, the ultimate pressure reaching about 2 millimeters mercury absolute. To the resulting crude aspirin anhydride product mixture was added about 4,000 cc. of tetrachloroethylene, pure aspirin anhydride crystallizing from the so-produced solution. This product was removed by filtration under vacuum, the crystalline product washed with about 2,000 grams of tetrachloroethylene, and the separated product dried at about 50° C. to yield aspirin anhydride having a melting point of about 83° to 85° C., in about 80 percent yield.

Example 4

Into about 138 grams salicylic acid in 100 grams of acetone, ketene was bubbled at about 20° to 25° C. over about a 12 hour period. The acetone then was distilled off until the pot temperature reached 85° C. at a pressure of 200 millimeters mercury absolute. Subsequent distillation of acetic anhydride from the reaction mixture over about a 5½ hour period at about 90° C. and at a minmium of about 23 millimeters mercury pressure yielded the crude aspirin anhydride product. This product was cooled and dissolved in about 200 cc. of tetrachloroethylene, from which solution the substantially pure aspirin anhydride crystallized. The aspirin anhydride was removed by filtration, washed with 60 grams of tetrachloroethylene and the product dried at about 50° C. In this example, about 74 percent yield aspirin anhydride, melting from about 83.5° C. to about 86° C., was obtained.

Example 5

Into about 180 grams of aspirin in 100 grams of acetone there was bubbled ketene with stirring at about 20° to 25° C. over a period of about 6 hours. Treatment of this reaction mixture was carried out the same as in Example 4, except that the acetone was removed by distillation at about 86° C. and 150 milliliters mercury pressure over a 1 hour period followed by subsequent distillation of acetic anhydride from the mixed anhydride at about 90° C., at a minimum of about 12 millimeters pressure mercury, over a 6 hour period. The residual crude aspirin anhydride was dissolved in about 250 milliliters of tetrachloroethylene, and the resulting aspirin anhydride product which crystallized therefrom was filtered under vacuum, washed with about 120 grams of tetrachloroethylene and dried at 50° C. to give the product having a melting point of from 83.5° to 86.5° C., in a yield of about 84 percent.

Example 6

Using the same mix composition and procedure as in Example 1, distillation of acetic anhydride and acetic acid from aspirin-acetic anhydride at about 55° C. for about 15 hours, followed by the crystallization of the product in the same manner as Example 1 yields substantially pure, crystalline aspirin anhydride.

Example 7

Aspirin (180 g., 1.0 mole), acetic anhydride (60 g., 0.59 mole), 350 ml. ethylbenzene, and 2 grams of powdered, dry "Dowex 50" cationic exchange resin were refluxed at 230–250 millimeters mercury absolute pressure and at about 95–100° C. for about 2 hours. Following this reflux period the acetic acid and acetic anhydride were slowly distilled off over an 8 hour period, the distillation temperature being held at 95–100° C. by regulating the pressure of the system until a final pressure of about 150 mm. mercury absolute was reached. The residual solution of aspirin anhydride in ethylbenzene was filtered at about 60° C. to remove the catalyst. The filtrate then was stirred while cooling to room temperature, the aspirin anhydride crystallizing directly therefrom.

Example 8

In the same manner as in Example 1, 360 grams of aspirin and 817 g. of acetic anhydride (equivalent to a mole ratio of about 4 moles of acetic anhydride per mole aspirin) were reacted at atmospheric pressure for about a half hour at about 85° C., followed by distillation, at this same temperature, of the acetic acid and acetic anhydride over about an 8 hour period under continually decreasing pressure, the ultimate pressure reaching about 0.3 millimeter mercury absolute. To the resulting crude aspirin anhydride product mixture was added about 600 milliliters of tetrachloroethylene, substantially pure aspirin anhydride crystallizing from this so-produced solution. The aspirin anhydride was separated by filtration under vacuum, the product washed with about 200 cc. of tetrachloroethylene, and then dried at about 50° C.

Various modifications can be made in this invention without departing from the spirit or scope thereof for it is understood that we limit ourselves only as defined in the appended claims.

We claim:

1. A process for the preparation of substantially pure pharmaceutical grade, crystalline aspirin anhydride which comprises; (1) reacting a member selected from the group consisting of salicylic acid and acetylsalicylic acid with a molar excess of acetic anhydride at a temperature range from about 80° C. to about 100° C. for at least about 1 hour, (2) maintaining the so-reacted acid and acetic anhydride under substantially anhydrous conditions over a period of from about 3 to about 20 hours at a temperature of from about 50 to about 100° C. and under a continually decreasing pressure to give an ultimate maximum absolute pressure of about 25 millimeters of mercury, (3) dissolving the so-produced crude aspirin anhydride in an inert organic solvent, and (4) crystallizing substantially pure aspirin anhydride therefrom.

2. A process for the preparation of substantially pure pharmaceutical grade, crystalline aspirin anhydride which comprises in combination (1) reacting under substantially anhydrous conditions over a temperature range from about 80° C. to about 100° C. for about 1 hour salicylic acid with acetic anhydride, utilizing from about 3.5 to about 5 moles of acetic anhydride per mole of salicylic acid, (2) maintaining the so-reacted salicylic acid and acetic anhydride under substantially anhydrous conditions over a period of from about 3 to about 7 hours at a temperature of from about 80 to about 90° C. and under a continually decreasing pressure to give an ultimate maximum absolute pressure of from about 0.1 to about 2 millimeters of mercury thereby distilling acetic anhydride and the co-produced acetic acid therefrom, (3) dissolving the so-produced crude aspirin anhydride in tetrachloroethylene, and (4) crystallizing substantially pure pharmaceutical grade, crystalline aspirin anhydride from the tetrachloroethylene solution.

3. A process for the preparation of substantially pure pharmaceutical grade, crystalline aspirin anhydride which comprises; (1) refluxing for at least about 1 hour acetylsalicylic acid with a molar excess of acetic anhydride in the presence of a solvent, said solvent being inert to the reaction products and mixed ingredients and said solvent forming an azeotropic mixture with acetic acid and acetic anhydride, (2) distilling the so-produced acetic acid and acetic anhydride therefrom at the reflux temperature of the azeotropic mixture of acetic acid, acetic anhydride and said solvent while regulating the pressure of the system until an absolute pressure of about 150 millimeters mercury is reached thereby to maintain the distillation temperature at the reflux temperature, (3) cooling the residual solution of aspirin anhydride in said solvent to about room temperature thereby to crystallize substantially pure pharmaceutical grade aspirin anhydride therefrom and (4) separating the aspirin anhydride from said solution.

4. The process as defined in claim 3 wherein catalytic amounts of an acid form of a cationic exchange resin are added to the refluxing mixture of acid, acetic anhydride and solvent and including the step of filtering the residual solution of aspirin anhydride in the solvent prior to crystallization of the aspirin anhydride therefrom thereby to remove said resin from said solution.

5. A process for the preparation of substantially pure, pharmaceutical grade, crystalline aspirin anhydride which comprises in combination (1) reacting under substantially anhydrous conditions over a temperature range from about 80° C. to about 100° C. for about 1 hour one mole acetylsalicylic acid with from about 3.5 to about 5 moles of acetic anhydride, (2) maintaining, at a temperature of from about 80 to about 90° C., the so-reacted acetylsalicylic acid and acetic anhydride under substantially anhydrous conditions over a period of from about 3 to about 7 hours and under a continually decreasing pressure to give an ultimate maximum absolute pressure of from about 0.1 to about 2 millimeters of mercury thereby distilling acetic anhydride and the co-produced acetic acid therefrom, (3) dissolving the so-produced crude aspirin anhydride in tetrachloroethylene, and (4) crystallizing substantially pure, pharmaceutical grade, crystalline aspirin anhydride from the tetrachloroethylene solution.

References Cited in the file of this patent

UNITED STATES PATENTS

| | | |
|---|---|---|
| 2,236,125 | Gaylor | Mar. 25, 1941 |
| 2,423,569 | Sokol | July 8, 1947 |